J. C. YOKUM.
BRANDING AND DEHORNING SQUEEZERS FOR CATTLE.
APPLICATION FILED SEPT. 17, 1917.
1,273,305.
Patented July 23, 1918.
2 SHEETS—SHEET 2.
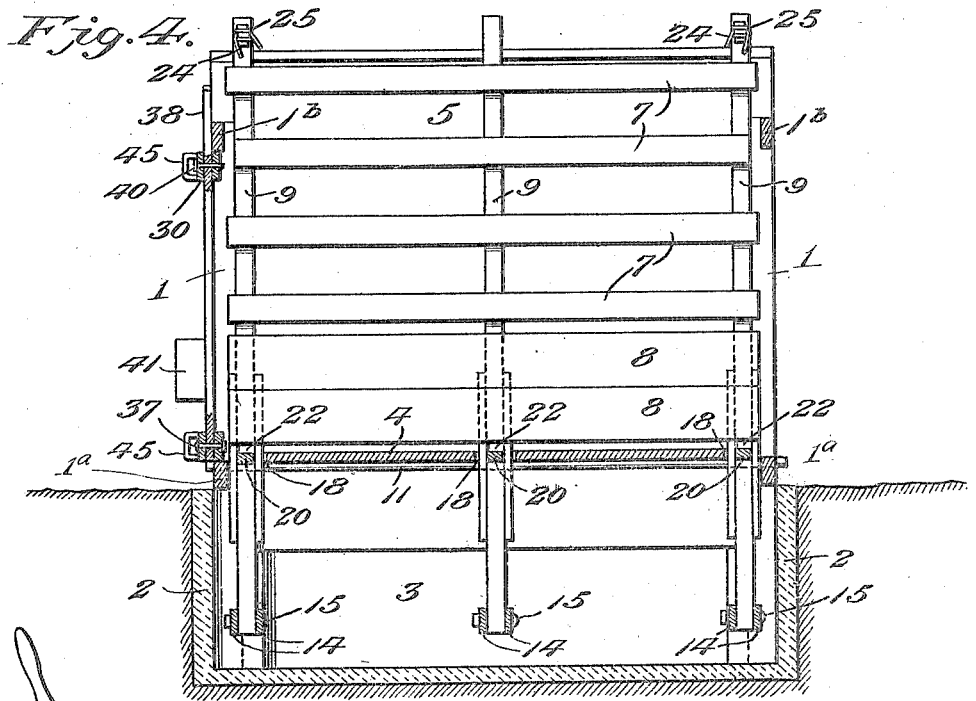
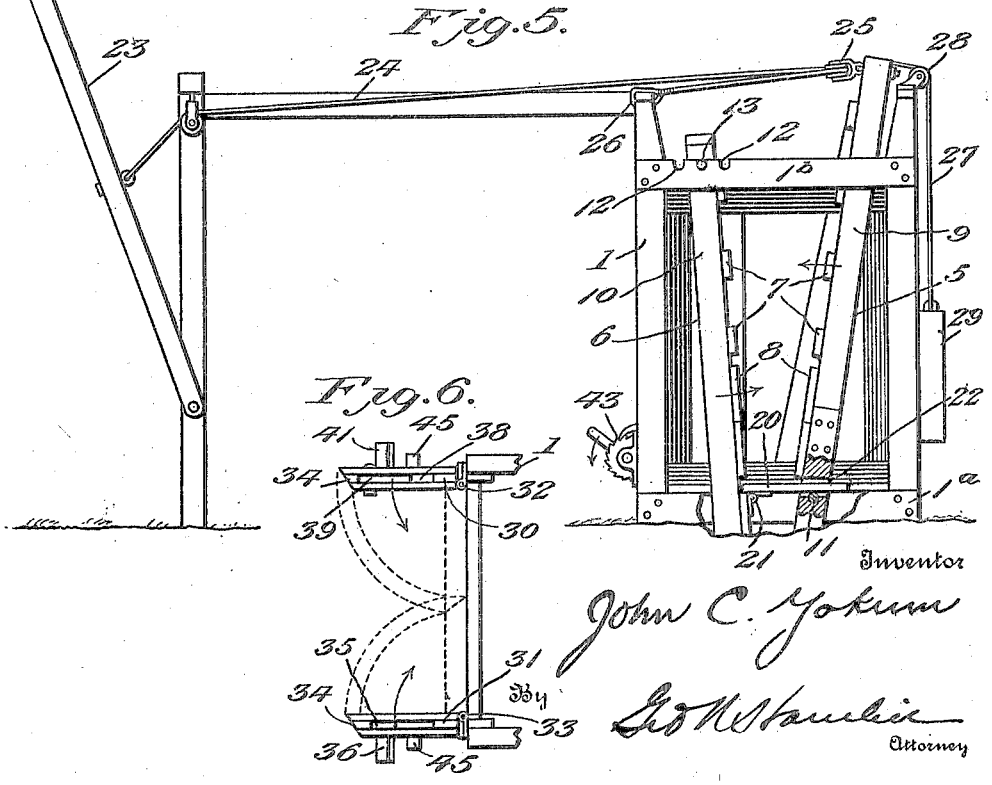
Inventor
John C. Yokum
By
Attorney

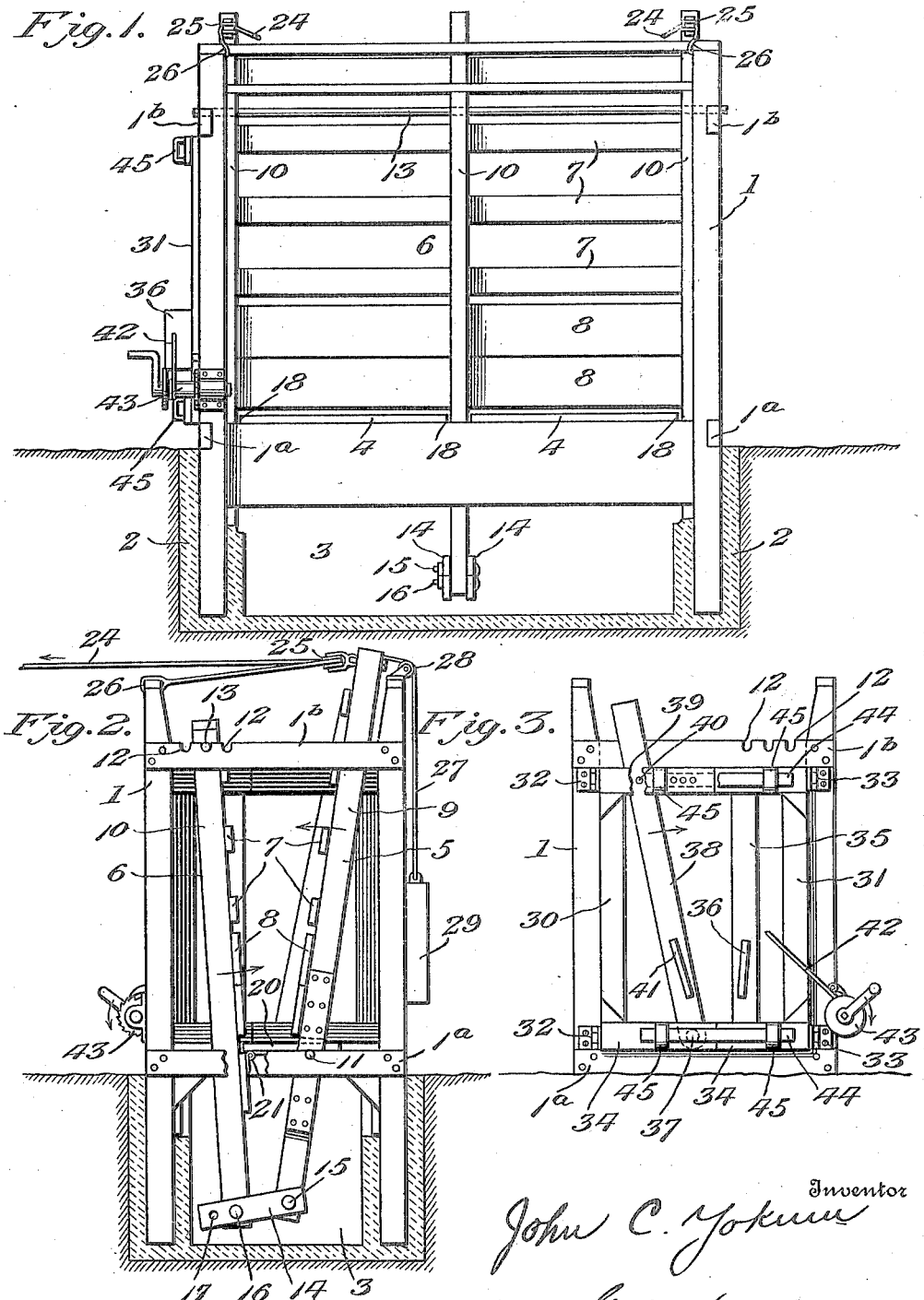

UNITED STATES PATENT OFFICE.

JOHN C. YOKUM, OF CHICAGO, ILLINOIS.

BRANDING AND DEHORNING SQUEEZERS FOR CATTLE.

1,273,305. Specification of Letters Patent. Patented July 23, 1918.

Application filed September 17, 1917. Serial No. 191,780.

*To all whom it may concern:*

Be it known that I, JOHN C. YOKUM, a citizen of the United States, residing at Chicago, county of Cook, and State of Illinois, have invented certain new and useful Improvements in Branding and Dehorning Squeezers for Cattle, of which the following is a specification.

The present invention relates to those devices which are used to hold cattle when being branded or dehorned. I term my invention a "squeezer" because its construction adapts it to squeeze or bear on the sides of the animal to prevent any movement of the legs or other parts of the body, but without injury to the same.

My object is to provide improvements in the movable sides of the squeezer whereby both sides will be jointly operated, facilitating movement thereof to bring them properly against the animal; further, to provide adjustable fulcrum means whereby the angle of the squeezing side may be changed according to the size of the animal, and adjustable links or couplings between the squeezing sides for the same purpose.

A further object is the provision of a novel split gate so arranged that when the branding or dehorning operation has been completed, the parts of the gate may be released and the animal allowed to walk out, thus obviating the necessity of backing the animal out of the device, which is troublesome, slow and inconvenient and has constituted a defect heretofore existing in cattle holding devices of this general character.

In connection with my improved split gate, I provide novel means carried by the respective sections thereof, for holding the head of the animal so that he cannot toss or move his head when the dehorning operation is going on. To hold the head of the animal down within the gate, there may be employed a halter and windlass of any kind.

In my squeezer the stanchions are entered in a foundation in the earth or floor of the building and the lower ends of the squeezing sides are disposed in a trough or space below the floor or platform on which the animal stands. Consequently, there are no protruding or projecting parts to catch and trip or injure the animal. Where the beams of the squeezing sides pass through the floor, I provide safety false bottom devices so that the animal cannot catch his hoofs in these open spaces; these false bottom devices are related to the beams of the movable squeezing sides in an improved manner.

Block and tackle means of any preferred kind may be employed for shifting the movable sides. I have shown and described a simple lever combined with cables and sheaves for that purpose. To restore the movable squeezing sides to normal position when the pressure is released, counterweights may be used.

The embodiment of the invention which is hereinafter set forth is susceptible of modification in certain particulars and I do not, therefore, limit myself to those details which are hereinafter described and shown in the accompanying drawings, the same being considered as illustrative, rather than restrictive, of the scope of the invention.

In the accompanying drawings:

Figure 1 is a side elevation, the foundation being broken away;

Fig. 2, an elevation of the entry end of the device, parts being broken away;

Fig. 3, an end elevation of the de-horning gate, certain parts being omitted and others broken away;

Fig. 4, a vertical longitudinal section;

Fig. 5, an end elevation looking toward the entry part and showing the operating lever; and Fig. 6, a detail plan view illustrating the open and closed positions of the sections of the de-horning gate.

The main frame 1 consists of stanchions whose lower ends are sunk in concrete piers 2 and between which below the surface of the ground is a pit or trench 3 to receive the lower ends of the beams of the squeezing sides. Cross-pieces connect the stanchions at the floor or ground line and at a sufficient height to permit entry and exit of the cattle. A floor 4 is arranged on stringers connecting the stanchions and forming a part of the frame 1.

The squeezing sides 5 and 6 comprise longitudinal slats or boards, the upper ones 7 of which are spaced apart and the lower ones 8 arranged as a wall running up to a suitable height to prevent the hoofs of the animal from being caught. The walls 8 are arranged to lie close to the floor 4. The sides are carried by upright beams which are shown at 9 and 10 for the respective sides. The side 5 is provided with a pipe 11 which is mounted in the lower cross-pieces 1ª of the frame 1 and runs through the beams 9. The side 5 is thus fulcrumed intermediate its ends and its entire upper portion above the floor is free to swing within the frame 1.

The upper cross-pieces 1ᵇ of the frame are provided with a series of notches 12 which receive a pipe 13 passing through the upper ends of the beams 10 of the side 6. The side 6 is thus pivotally hung from the pipe 13. The lower ends of the beams 10 are connected to the lower ends of beams 9 in the pit of trench 3 by links 14 and bolts 15, 16. The bolts 16 can be passed through any one of the openings 17 in the links. By this means, and the shifting of the pipe 13 into the desired notches 12, any angular relationship of the side 6 to the side 5 may be obtained. The adjustment thus provided enables the sides 5 and 6 to be disposed close together or farther apart according to the size of the animal which is to be branded or dehorned. The coupling together of the sides 5 and 6 by the links 14, combined with the hanging of the side 6 by the pipe 13 and the pivoting of the side 5 intermediate its ends by the pipe 11, causes both sides to be actuated when the block and tackle mechanism is operated, to thus quickly and powerfully embrace the animal, but without injury to the latter, in addition to providing for all necessary adjustments. To prevent the hoofs of the animal from passing into the slots 18 in the floor 4, where the beams 9 and 10 pass through, there are provided fillers or false bottom pieces 20 hinged at 21 to beams 10 and passing loosely through slots 22 in beams 9.

At a suitable point there is provided an operating lever 23 from which ropes or cables 24 extend to pulleys 25 on the upper ends of the beams 9, thence passing to the upper part of frame 1 and being fastened thereto at 26. By operating the lever, the cables are pulled upon, thus simultaneously swinging the sides on their fulcrums and squeezing them against the opposite sides of the animal. To return the sides to normal position after the lever is released, cables 27 connected to beams 9 and running over pulleys 28 and having counterweights 29, are provided.

At the end of the frame 1 where the animal's head is disposed, I provide a split dehorning gate comprising the sections 30, 31, respectively hinged to the frame 1 at 32, 33, and provided with parts 34 which are arranged to overlap. The section 31 has a slat 35, which is fixed and is provided with an outwardly extending board or member 36. Pivoted at 37 to the lower part of the section 30 is a lever 38 whose upper end is slidable in a slot 39 in the section 30. Suitable means, such as 40, may be provided for holding the slat or member 38 in locked position. The lever 38 has a board 41 corresponding to the board 36. The boards 36 and 41 are located at the lower portion of the gate in position to embrace the sides of the neck of the animal when his head is arranged for de-horning. A halter (not shown) is placed around the animal's head and connected to a cable 42 which may be wound on a windlass 43. By this means the head of the animal may be drawn down until in position to be grasped by the boards 36, 41, whereupon the lever 38 may be swung to a suitable position and secured by the locking means 40. De-horning may then be readily accomplished. To prevent the sections 30, 31 from swinging outwardly while the animal's head is being held, locking bars 44, disposed in loops 45 at the upper and lower portions of the gate, may be used.

After de-horning has been accomplished, the windlass is released and the cable detached from the halter. The locking means 40 is then released to allow the lever 38 to swing open. Upon withdrawing the locking bars 44 and releasing the sides 5, 6, the animal will walk out of the device, opening the split gate when doing so. The split dehorning gate enables a much quicker operation and driving of the animal out of the device than would be possible if he had to be backed out, as has heretofore been done.

The open construction of the sides 5, 6, at a suitable height above the floor 4, enables the branding iron to be readily introduced.

Having thus described my invention, what I claim as new and desire to secure by Letters Patent, is:—

1. In a squeezer for cattle, the combination with a floor, of movable sides, one of which is pivoted at its lower portion below the floor, an adjustable pivot for the upper portion of the remaining side whereby it may be set closer to or farther from the first-named side, operative connections between the sides located below the floor, whereby both of said sides are adapted to move when one of them is shifted, and means for imparting movement to one of the sides.

2. In a squeezer for cattle, the combination with a floor, of movable sides one having a fulcrum in the region of the floor, and the other being hung from an adjustable fulcrum at its upper portion, said sides extending below the floor having an adjustable operative connection located below the floor, whereby movement imparted to one of the sides will be communicated to the other side.

3. In a squeezer for cattle, the combination with a floor and a frame, of movable sides, one of which has a fulcrum located in the region of the floor and is provided with extensions located below the floor, the other side having a fulcrum at its upper portion on the frame and provided with extensions below the floor, connections for said extensions located below the floor, and slidable fillers connected to one of the sides and movable relative to the other side, serving to close the openings in the floor where the extensions pass therethrough.

4. A de-horning gate for a squeezer for cattle, comprising hinged sections, one of which has a member adapted to engage the head of the animal, the other section carrying an upright shiftable lever pivoted at its lower end and adapted to engage the head of the animal, means for locking the sections in closed position, and means for holding the lever in locked position.

In testimony whereof, I hereunto affix my signature.

JOHN C. YOKUM.

Copies of this patent may be obtained for five cents each, by addressing the "Commissioner of Patents, Washington, D. C."